Dec. 30, 1969      H. E. TRACY      3,486,760

MECHANICAL SEAL ASSEMBLY WITH LUBRICATING MEANS

Filed Jan. 17, 1968      2 Sheets-Sheet 2

INVENTOR
HERBERT E. TRACY
BY John O. Evans, Jr.
ATTORNEY

United States Patent Office 3,486,760
Patented Dec. 30, 1969

---

3,486,760
MECHANICAL SEAL ASSEMBLY WITH LUBRICATING MEANS
Herbert E. Tracy, Alhambra, Calif., assignor to Borg-Warner Corporation, Chicago, Ill., a corporation of Delaware
Filed Jan. 17, 1968, Ser. No. 698,568
Int. Cl. F16j *15/40, 15/44;* B65d *53/00*
U.S. Cl. 277—74                                    5 Claims

ABSTRACT OF THE DISCLOSURE

A mechanical seal assembly for sealing a rotary shaft to a housing, the assembly having a stationary sealing ring with an internal fluid passage through which lubricating fluid is injected into an annular sealng zone between the stationary sealing ring and a complementary, relatively rotatable sealing ring. Components for mounting the stationary sealing ring and for conducting lubricating fluid from the exterior to the internal fluid passage are provided and so arranged that, when necessary, the sealing ring is readily removed from the assembly for replacement by a new or repaired sealing ring. The components for conducting lubricating fluid to the annular sealing zone include a fluid coupler sealed in an improved manner to the stationary sealing ring.

CROSS-REFERENCE TO RELATED APPLICATIONS

The present invention is an improvement in the mechanical seal assembly of my copending application Ser. No. 791,859, filed Jan. 2, 1969, which is a continuation of application Ser. No. 469,700, filed July 6, 1965, for "Mechanical Seal Construction."

BACKGROUND OF THE INVENTION

Field of the invention

This invention relates to a mechanical seal assembly for sealing a rotary shaft to a housing having a shaft opening through which the shaft extends. More particularly, the invention is concerned with a mechanical seal assembly including means for injecting lubricating fluid into the annular sealing zone between the relatively rotatable sealing rings.

Description of the prior art

Canadian Patent No. 632,217, issued Dec. 5, 1961, for "Annular Face Seals," John M. Gardner, relates to mechanical seals having means for injecting fluid into the annular sealing zone between relatively rotatable sealing rings. In the mechanical seals disclosed in the Canadian patent, a stationary carbon sealing ring is mounted in a backing member or backing ring. The carbon ring has an annular groove formed in its sealing surface. A fluid injection conduit extends through the backing ring and through the carbon ring, and terminates in the annular groove for conducting fluid into the annular sealing zone. The portion of the fluid injection conduit in the backing ring has an outlet end that registers with the inlet end of the portion of the fluid injection conduit in the carbon sealing ring, the registered ends of these conduit portions meeting at the mated surfaces of the two rings. These mated surfaces are exposed at their common outer periphery with fluid on one side of the seal, and their common inner periphery with fluid on the other side of the seal, and the registered ends of the conduit portions must be sealed against leakage along the mated surfaces. As the fluid pressure in the fluid injection conduit is greater than the fluid pressure on either side of the mechanical seal, the problem of sealing the registered ends of the conduit portions is acute, especially with respect to the fluid on the low pressure side of the mechanical seal. In the devices shown in the Canadian patent, such sealing is accomplished by the tightness of the joint between the backing ring and the carbon ring.

SUMMARY OF THE INVENTION

An object of the invention is to provide an improved mechanical seal assembly wherein fluid is injected between the opposed, relatively rotatable sealing surfaces of the sealing rings.

Another object is to provide such a mechanical seal assembly having an improved coupler for coupling an injection fluid conduit to one of the sealing rings through which the fluid is injected into the space between the sealng rings.

Other objects, aims and advantages of the invention will appear hereinafter.

In brief, the invention resides in a mechanical seal assembly for sealing a rotary shaft to a partition having a shaft opening through which the shaft extends, the assembly comprising: a rotary sealing ring fixed to the shaft; means for sealing the rotary sealing ring to the shaft; a rotationally stationary sealing ring; the sealing rings having cooperating sealing surfaces in opposed, relatively rotatable, mutual sealing relation along a generally annular sealing zone surrounding the shaft; means for mounting the stationary sealing ring on the partition for axial movement away from and towards the rotary sealing ring; means for sealing the stationary sealing ring to the partition; the means for sealing the rotary sealing ring to the shaft, the rotary sealing ring, the cooperating sealing surfaces, the stationary sealing ring, and the means for sealing the stationary sealing ring to the partition coacting to provide a barrier precluding substantial flow of fluid between the shaft and the partition; means for injecting lubricating fluid into the annular zone including means providing a fluid passage that extends through the statonary sealing ring and terminates, at one end, in the relatively rotatably sealing surface of the stationary sealing ring and, at the other end, in a surface of the stationary sealing ring disposed on one side of the barrier, a flexible fluid conduit on the one side of the barrier and fixed to the partition, coupler means disposed entirely on the one side of the barrier for effecting a fluid connection between the conduit and the fluid passage means, and sealing means surrounding the fluid passage means for sealing the coupler means to the stationary sealing ring.

DESCRIPTION OF THE PREFERRED EMBODIMENT

Figure 1:
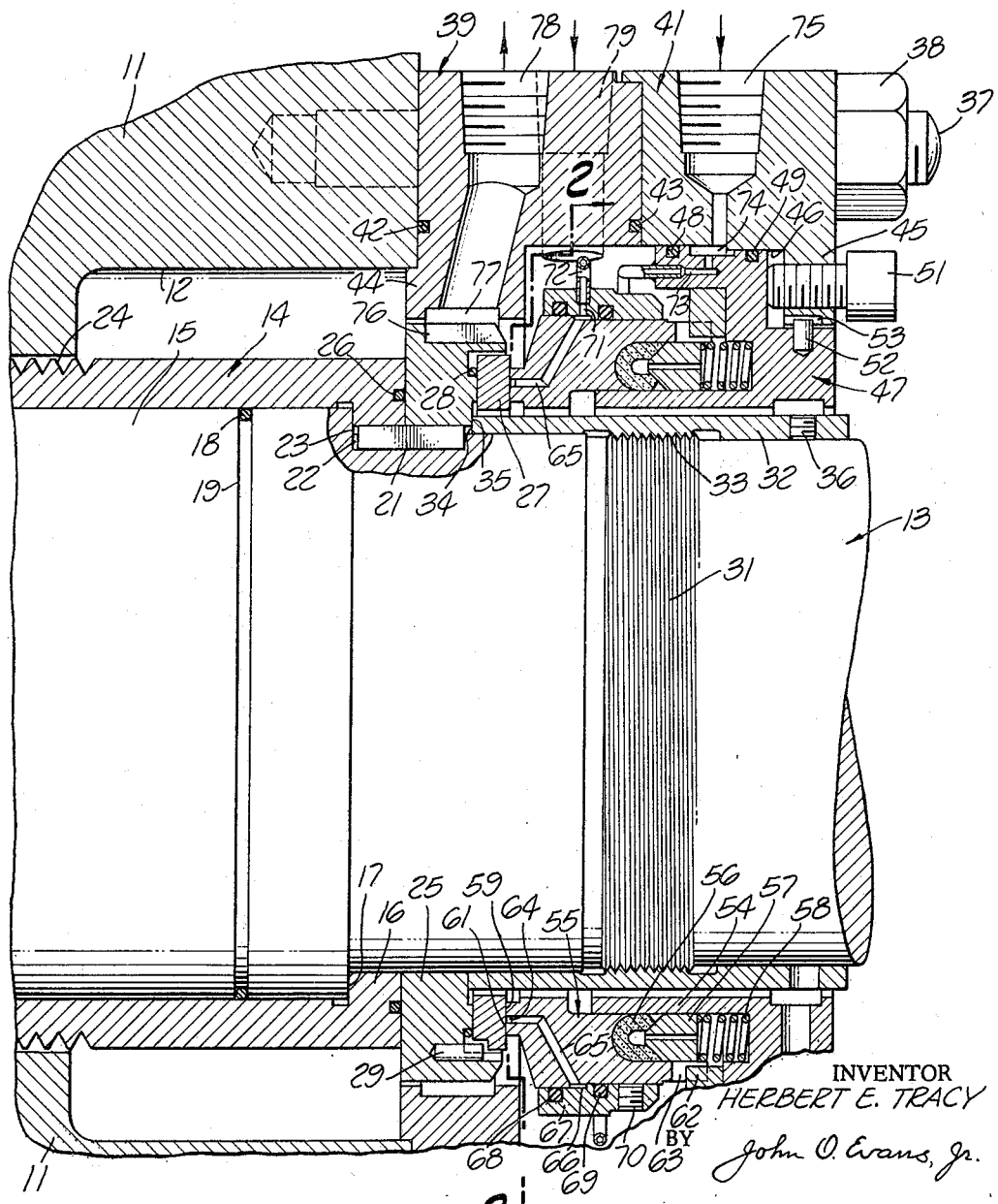
FIG. 1 is an axial, sectional view of an exemplary form of a mechanical seal assembly in accordance with the invention.
Figure 2:
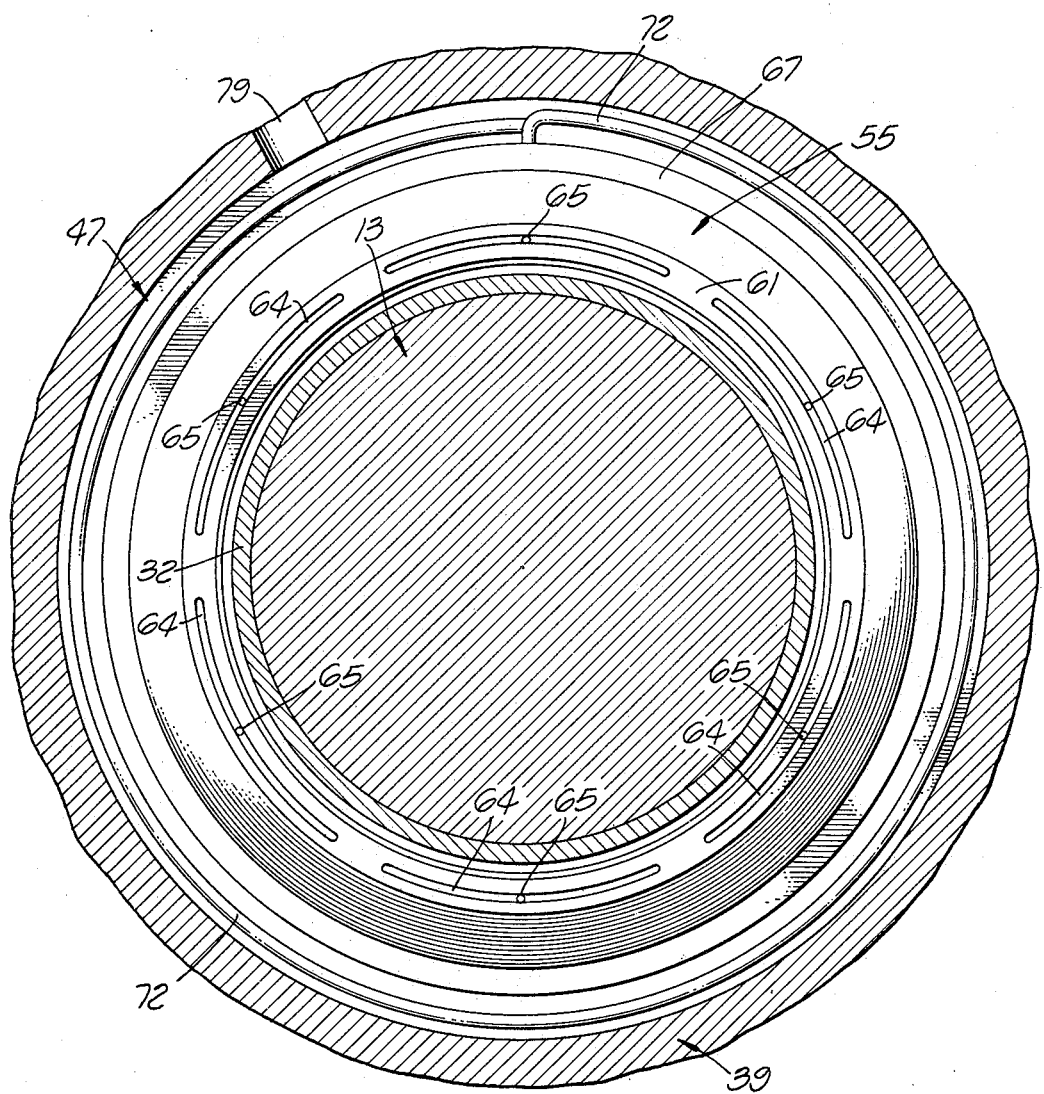
FIG. 2 is a sectional view taken along the line 2–2 of FIG. 1 and looking in the direction of the arrows.

Referring to FIGS. 1 and 2, the mechanical seal assembly shown therein is carried in part by a partition 11 having a shaft opening 12 extending through the partition. The partition may be a pump casing, for example, in which a liquid under high pressure is contained. The liquid under pressure within the casing tends to escape through the shaft opening 12 from left to right, as seen in FIG. 1. Other parts of the mechanical seal assembly are carried by a shaft 13 that extends through the shaft opening 12. The shaft 13 is suitably mounted for rotation and is driven by a motor (not shown) to turn the pump impeller (not shown) or other device within the casing 11.

A shaft sleeve 14 is mounted on an enlarged portion 15 of the shaft. The sleeve has an inturned flange portion 16 that abuts a shoulder 17 on the shaft. The shaft sleeve is sealed to the shaft by an O-ring gasket 18 received in a groove 19 on the shaft. A longitudinal key 21 is disposed in a keyway 22 in the shaft and in an opposed keyway 23 in the shaft sleeve to lock the sleeve to the shaft for rotation therewith. The shaft sleeve has a labyrinth seal 24 that cooperates with the partition 11 to restrict out-flow of liquid from the housing if the mechanical seal should fail.

Mounted on the shaft 13 is a rotary sealing ring body 25 which is keyed to the shaft by the key 21 so that the body rotates with the shaft. The body 25 is sealed to the shaft sleeve 14 by an O-ring gasket 26. The rotary sealing ring body 25 carries a rotary sealing ring 27 that is sealed to the body by another O-ring gasket 28. A drive pin 29 locks the rotary sealing ring 27 to the body 25 so that they rotate together.

The shaft 13 is provided with threads 31. A shaft sleeve nut 32, having mating threads 33, is screwed to the shaft, with the inner end 34 of the nut pressed against the face 35 of the rotary sealing ring body 25 to force it against the shaft sleeve 14 so that the inturned flange portion 16 is pressed against the shoulder 17 to restrain the body 25 and the shaft sleeve from longitudinal displacement on the shaft. A set screw 36 threaded in the nut 32 is forced against the shaft 13 to prevent the nut from becoming unthreaded.

It will thus be seen that the shaft sleeve 14, the rotary sealing ring body 25, the rotary sealing ring 27, and the shaft sleeve nut 32 turn with the shaft 13.

Threaded into the partition 11 are one or more studs 37, each having a nut 38 for fastening an inner flange 39 and an outer flange 41 to the partition 11. An O-ring gasket 42 seals the inner flange 39 to the partition 11 and another O-ring gasket 43 seals the outer flange 41 to the inner flange. The inner flange 39 has an inturned portion 44, and the outer flange 41 also has an inturned portion 45 defining therebetween an annular recess 46. A spring holder ring 47 is longitudinally slidable in the recess and sealed thereto by O-ring gaskets 48 and 49. One or more adjusting screws 51, threaded through the inturned portion 45 of the outer flange 41, serve to longitudinally position the spring holder ring 47 in the annular recess 46. The spring holder ring 47 has a drive pin 52 slidably engaged in a longitudinal slot 53 in the outer flange 41 to prevent rotation of the spring holder ring in the outer flange.

The spring holder ring 47 has an inwardly extending, axial spigot portion 54 on which is slidably mounted a rotationally stationary sealing ring 55. The stationary sealing ring is slidably sealed to the spigot portion 54 by a flexible U-cup seal 56 backed up by a follower ring 57 that is slidable on the spigot portion. A plurality of helical springs 58 are compressed between the follower ring 57 and the spring holder ring 47 to urge the follower ring, the U-cup seal, and the stationary sealing ring to the left, as seen in FIG. 1, to press the stationary sealing ring 55 against the rotary sealing ring 27.

The rotary sealing ring 27 has a radially extending sealing surface 59 in relatively rotatable sealing relation to the opposed, radially extending, sealing surface 61 of the stationary sealing ring 55. It will be understood that these relatively rotating sealing surfaces 59 and 61 are finished, as by lapping, to substantially plane, highly polished faces, as is customary in the mechanical seal art.

The stationary sealing ring 55 is prevented from rotating on the spigot portion 54 by one or more lugs 62, welded to the spring holder ring 47, and are engaged in corresponding slots 63 in the stationary sealing ring.

Apparatus for injecting lubricating liquid or fluid into the annular sealing zone between the sealing surfaces 59 and 61 will now be described. As best seen in FIG. 2, the sealing surface 61 of the stationary sealing ring is provided with a plurality of circumferentially spaced, arcuate grooves 64. Each groove has a fluid passage 65 for conducting lubricating fluid from the outer periphery of the stationary sealing ring into the groove and thence into the annular sealing zone. The outer ends of the passages 65 terminate in a circumferential fluid header 66 provided between the outer periphery of the stationary sealing ring and an encircling coupler or adapter ring 67. The adapter ring is sealed to the stationary sealing ring by a pair of axially spaced O-ring gaskets 68 and 69 that prevent fluid leakage between the circumferential fluid header 66 and the annular recess 46. A fluid channel 71 is provided in the adapter ring 67 for conducting lubricating fluid into the circumferential header 66. A flexible fluid conduit 72 is welded or soldered into the outer end of the fluid channel 71. As best seen in FIG. 2, the flexible conduit 72 is wrapped around the outside of the adapter ring 67 for one turn and soldered into the opening of a fluid passage 73 formed in the spring holder ring 47. This fluid passage receives lubricating fluid from an annular conduit 74 provided between the outer periphery of the spring holder ring 47 and the adjacent portion of the outer flange 41. Injection fluid is fed into the annular conduit 74 through a fluid inlet passage 75 in the outer flange 41.

It will thus be seen that lubricating fluid introduced into the inlet passage 75 flows into the annular conduit 74, through the fluid passage 73, through the flexible fluid conduit 72, through the fluid channel 71, and into the circumferential fluid header 66, from whence it flows by way of the fluid passages 65 into the respective arcuate groove sections 64, and thence into the annular sealing zone between the relatively rotating sealing surfaces 59 and 61 to lubricate and cool the adjacent portions of the rotary and the stationary sealing rings.

The injection fluid that is fed under pressure into the fluid inlet passage 75 may come from any suitable source, such as a pump, an accumulator, or the like (not shown). One such source is shown and described in my aforementioned copending application, Ser. No. 469,700.

Although forming no essential part of the present invention, means are provided for cooling the mechanical seal. For a description of suitable cooling apparatus, reference is made to U.S. Patent No. 2,824,759, issued Feb. 25, 1958, H. E. Tracy, for "Liquid Cooled Seal." As adapted to the apparatus shown herein, the cooling arrangement includes pump vanes 76 formed on the periphery of the rotary sealing ring body 25. As the body 25 rotates, these vanes impel fluid from around the sealing rings into an annular channel 77 provided in the inturned portion 44 of the inner flange 39. From this annular channel, fluid is forced outwardly through a bore 78 formed in the flange 39. As indicated by the arrow, the hot fluid from the bore 78 flows outwardly and through an indirect heat exchanger (not shown) in which the fluid is cooled. The cooled fluid returns from the heat exchanger to an inlet bore 79 formed in the flange 39. Cooled fluid flows through the bore 79 into the annular recess 46 and over and around the stationary sealing ring and the rotary sealing ring to cool these components. After cooling these components, the fluid is recirculated by the pump vanes 76.

Referring to FIG. 1, it will be seen that the adapter ring 67 is releasably secured to the stationary sealing ring 55 by a set screw 70 which prevents the adapter ring from rotating and sliding axially on the stationary sealing ring.

The construction of the mechanical seal assembly of the present invention will be apparent from the foregoing description. The materials employed for the several components of the apparatus are those commonly used and well known in the mechanical seals art. Ordinarily, dissimilar materials are employed in the fabrication of the rotary sealing ring and the complementary stationary sealing ring. By way of example, the stationary sealing ring may be fabricated from bronze and the rotary sealing ring may be made of tungsten carbide.

In service, the relatively rotating sealing rings 27 and 55 are subject to wear, particularly at the opposed sealing surfaces 59 and 61, and occasionally have to be replaced. Replacement of the sealing rings is easily done by unthreading and removing the nut or nuts 38 from the stud or studs 37. The right-hand end of the shaft 13, as seen in FIG. 1, is uncoupled from its driver (not shown) to provide a free end over which seal components are removed from the shaft. The outer flange 41, and with it, the spring holder ring 47, the stationary sealing ring 55, the adapter ring 67, the flexible fluid conduit 72, and the parts for biasing the stationary sealing ring and for sealing it to the spring holder ring 47, are withdrawn as a unit to the right and removed from the shaft. Thereafter, the rotary sealing ring 27 is withdrawn to the right along the shaft and removed therefrom.

Upon loosening the set screw 70, the stationary sealing ring 55 is withdrawn from the adapter ring 67 by sliding the stationary sealing ring axially therefrom. If the U-cup seal 56 needs to be replaced, it may be removed from the spigot portion 54 and a replacement U-cup seal installed in its place.

In reassembling the mechanical seal, a new rotary sealing ring is first placed in position in the rotary sealing ring body 25, care being taken to engage the drive pin 29 in its corresponding slot in the rotary sealing ring.

A replacement stationary sealing ring 55 is inserted inside of the adapter ring 67 and over the spigot portion 54 of the spring holder ring 47, and the set screw 70 is tightened to lock the adapter ring and the stationary sealing ring together. The slots 63 in the stationary sealing ring are aligned with their corresponding lugs 62 on the spring holder ring 47, and the subassembly is replaced over the end of the shaft 13 and set in the position shown in FIG. 1. The retaining nuts 38 are replaced and tightened to complete the reassembling operation. Adjustment of the axial position of the spring holder ring is made with the adjusting screws 51 to prestress the helical springs 58 to the extent required.

The sealing surfaces 59 and 61 of the relatively rotatable sealing rings are subject to most rapid wear during the first few seconds or the first few minutes after the shaft 13 is started following a period of rest. With the present invention, a suitable lubricating fluid is injected into the annular zone between the sealing surfaces 59 and 61 during these periods of greatest wear. Thereafter, fluid injection may be stopped, and the seal allowed to function in the normal manner in which the relatively rotating sealing surfaces are lubricated by a thin film of the liquid that is being sealed. Because the pressure of the liquid at the radially outer circumference of the sealing surfaces 59 and 61 is greater than the pressure of the fluid at the radially inner circumference of the sealing surfaces, the liquid being sealed flows between these surfaces at a low rate but in sufficient volume to lubricate and cool the sealing surfaces and the adjacent ring portions.

It will be understood that when injection of lubricating fluid into the fluid inlet passage 75 is stopped, a valve or other suitable means (not shown) in the injection line is employed to prevent flow of fluid outwardly from the grooves 64 and back through the fluid injection line.

In accordance with this invention, the flexible fluid conduit 72 is coupled to the fluid passages 65 at a location disposed entirely on the high pressure side of the stationary sealing ring. Since the pressure within the fluid injection passages and the pressure of the fluid being sealed are always about the same, it will be seen that the problem of providing a seal between the flexible fluid conduit 72 and the fluid passages 65 in the stationary sealing ring 55 is not acute. Effective sealing at this point is readily accomplished by the O-ring gaskets 68 and 69. Of course, the invention is not limited to the use of these O-ring gaskets, and other sealing arrangements for this purpose will be readily apparent to those skilled in the mechanical seals art.

From the foregoing description it will be seen that the present invention provides an improved mechanical seal assembly that achieves the objects and advantages of the invention. The invention is not to be construed as limited to the preferred embodiment shown and described herein by way of example, but is to be interpreted broadly as defined in the following claims as interpreted in view of the prior art.

I claim:

1. A mechanical seal assembly for sealing a rotary shaft to a partition having a shaft opening through which the shaft extends, said assembly comprising:
    (a) a rotary sealing ring fixed to the shaft;
    (b) means for sealing said rotary sealing ring to the shaft;
    (c) a rotationally stationary sealing ring;
    (d) said sealing rings having cooperating sealing surfaces in opposed, relatively rotatable, mutual sealing relation along a generally annular sealing zone surrounding the shaft;
    (e) means for mounting said stationary sealing ring on the partition for axial movement away from and towards said rotary sealing ring;
    (f) means for sealing said stationary sealing ring to the partition;
    (g) said means for sealing said rotary sealing ring to the shaft, said rotary sealing ring, said cooperating sealing surfaces, said stationary sealing ring, and said means for sealing said stationary sealing ring to the partition coacting to provide a barrier precluding substantial flow of fluid between the shaft and the partition;
    (h) means for injecting lubricating fluid into said annular zone including means providing a fluid passage that extends through said stationary sealing ring and terminates, at one end, in the relatively rotatable sealing surface of said stationary sealing ring and, at the other end, in a surface of said stationary sealing ring disposed on one side of said barrier, a flexible fluid conduit on said one side of said barrier and fixed to the partition, coupler means disposed entirely on said one side of said barrier for effecting a fluid connection between said conduit and said fluid passage means, and sealing means surrounding said fluid passage means for sealing said coupler means to said stationary sealing ring.

2. A mechanical seal assembly as defined in claim 1 wherein said coupler means comprises an adapter ring surrounding said stationary sealing ring and carried thereby.

3. A mechanical seal assembly as defined in claim 2 wherein said means for sealing said coupler means to said stationary sealing ring comprise a pair of O-ring gasket means, one on each side of said fluid passage means, said gasket means surrounding and sealing said adapter ring to said stationary sealing ring.

4. A mechanical seal assembly as defined in claim 3 wherein said stationary sealing ring is removable from said adapter ring upon relative axial movement.

5. A mechanical seal assembly as defined in claim 4 including means for releasably locking said adapter ring to said stationary sealing ring.

References Cited

UNITED STATES PATENTS

| | | | |
|---|---|---|---|
| 2,326,824 | 8/1943 | Browne et al. | 277—88 X |
| 3,408,085 | 10/1968 | Van Spijk et al. | 277—74 X |
| 3,433,489 | 3/1969 | Wiese | 277—75 X |

FOREIGN PATENTS

| | | |
|---|---|---|
| 632,217 | 12/1961 | Canada. |
| 1,418,240 | 10/1965 | France. |

SAMUEL ROTHBERG, Primary Examiner

U.S. Cl. X.R.

277—75